Figure 1:
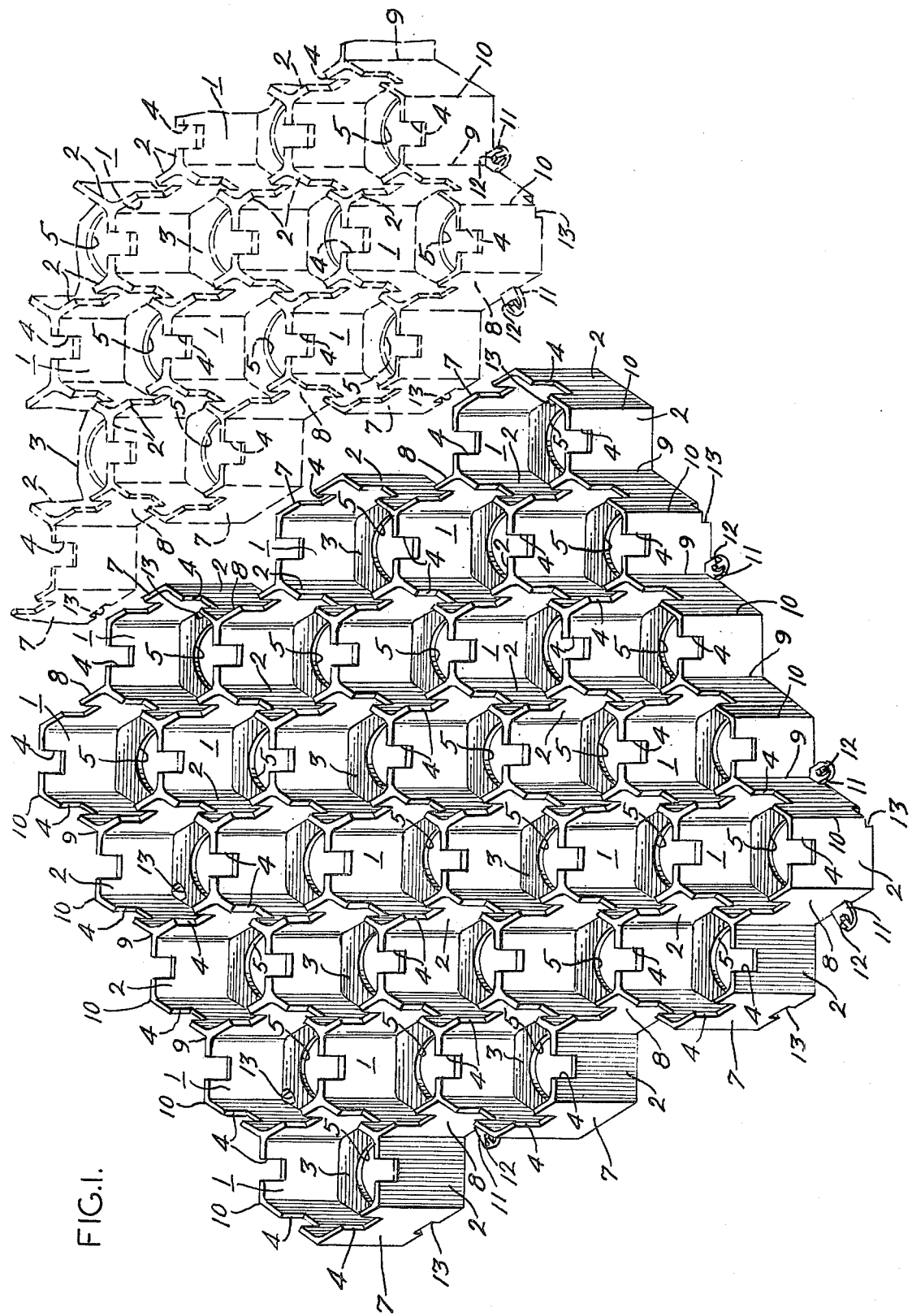

United States Patent [19]

Mascaro

[11] 4,111,585
[45] Sep. 5, 1978

[54] MODULE AND MODULAR SUPPORT FOR TURFGRASS AND LIKE AREAS

[76] Inventor: Thomas C. Mascaro, 2210 NE. 125th St., North Miami, Fla. 33186

[21] Appl. No.: 791,379

[22] Filed: Apr. 27, 1977

[51] Int. Cl.² ............................................. E01C 5/20
[52] U.S. Cl. ...................................... 404/70; 404/36; 52/181; 52/448; 52/660
[58] Field of Search ............... 404/70, 36, 34; 52/581, 52/660, 318, 663, 448, 181, 583, 180

[56] References Cited

U.S. PATENT DOCUMENTS

| Re. 957 | 5/1860 | Titus et al. | 52/581 |
|---|---|---|---|
| 70,076 | 10/1867 | Dean | 404/36 |
| 1,765,652 | 6/1930 | Burgess | 52/181 X |
| 1,974,279 | 9/1934 | Jones | 52/318 X |
| 2,443,589 | 6/1948 | Bates | 52/663 X |
| 3,040,637 | 6/1962 | Bremshey | 52/181 X |
| 3,181,440 | 5/1965 | Mullaney | 52/180 X |
| 3,909,996 | 10/1975 | Ettlinger | 404/36 X |

Primary Examiner—Nile C. Byers
Attorney, Agent, or Firm—Howson and Howson

[57] ABSTRACT

A modular structure for supporting weight loads and traffic in extensively used turfgrass areas comprising a plurality of identical modules having open cells defined by vertical wall portions and a bottom wall. The modules are disposed in laterally adjacent interengaging interlocked relation to form the modular structure which is imbedded in the turfgrass area to a depth slightly less than the height of the module cells so that the upper edge portions of the cell side walls extend into the turfgrass to support and bear the weight and wear of traffic passing over the area.

8 Claims, 15 Drawing Figures

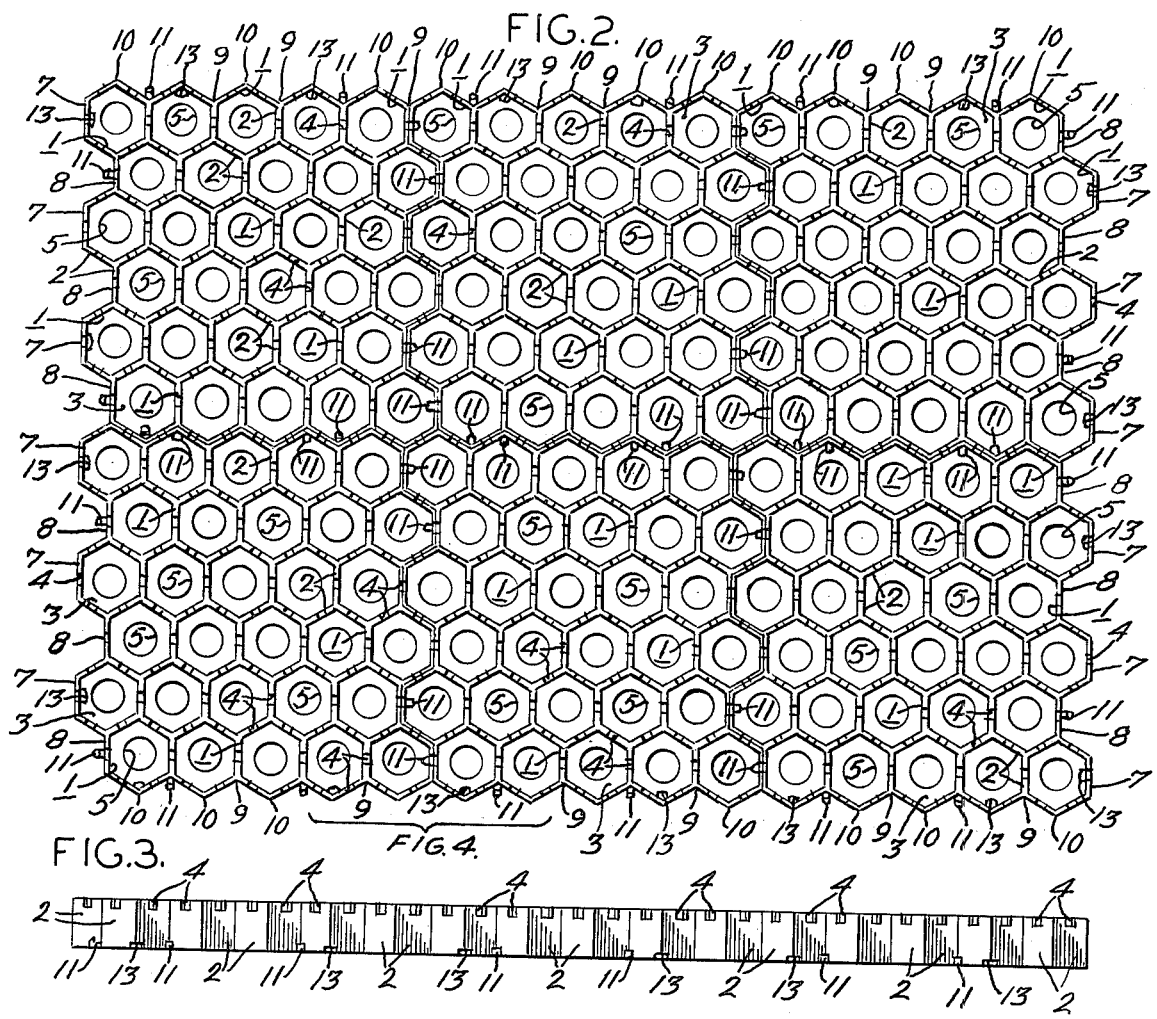
FIG. 2.
FIG. 3.
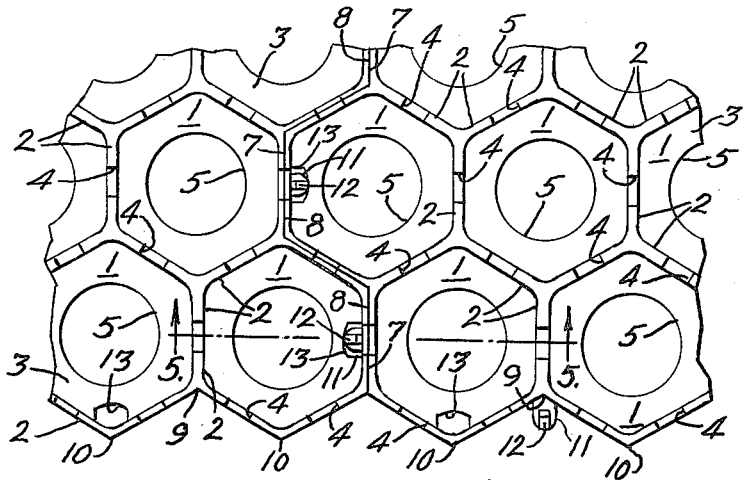
FIG. 4.
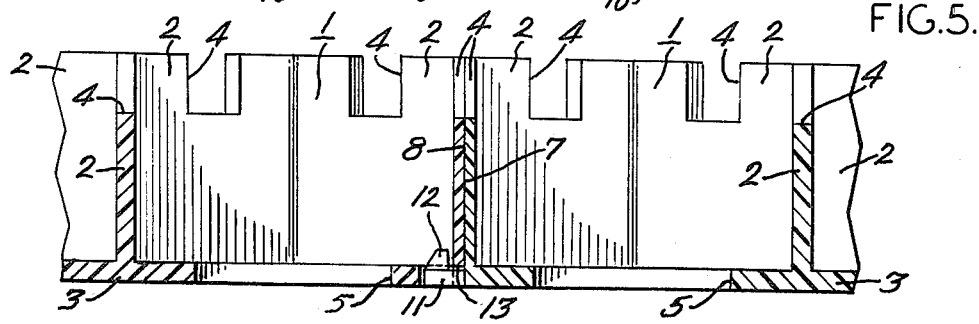
FIG. 5.

MODULE AND MODULAR SUPPORT FOR TURFGRASS AND LIKE AREAS

This invention relates to a novel modular structure for supporting traction and load weight in extensively used turfgrass and eliminating soil compaction and wear damage to the turfgrass. The structure is embedded in the selected turfgrass area just below the grade level thereof and comprises a plurality of contiguous interlocked identical modular units each consisting of a plurality of cells or chambers defined by vertical walls and a common bottom wall which effectively support load weight and traffic over the turfgrass area.

The invention is particularly useful in turfgrass areas that are subjected to heavy use and traction such as golf course foot and cart paths, maintenance roads, grass parking areas, grass airstrips and many other turfgrass areas that are subjected to severe soil compaction which inhibits the normal growth of turfgrasses, and wear which destroys the cell structure of the grass blades and, with some species, crown destruction as well.

With the foregoing in mind, an object of the present invention is to provide a novel modular structure comprising a plurality of interlocked identical modules or units of cellular construction that may be embedded in selected turfgrass areas to effectively support load weight and traffic thereover and eliminate soil compaction and turfgrass wear.

Another object of the invention is to provide a modular structure as set forth that is constructed and arranged to permit the turfgrass in which the structure is embedded to be mown by conventional equipment without damage to such equipment.

Another object of the invention is to provide a modular structure as set forth which is constructed and arranged so that the turfgrass roots grow through adjacent cells of the modular units and into the adjacent lateral and subsoil beneath the units thereby binding and securing the structure in and to the soil in which embedded.

A further object of the invention is to provide a modular structure as described which is of economical, light weight construction, is easy to install and is capable of providing many years of maintenance-free service.

Figure 6:
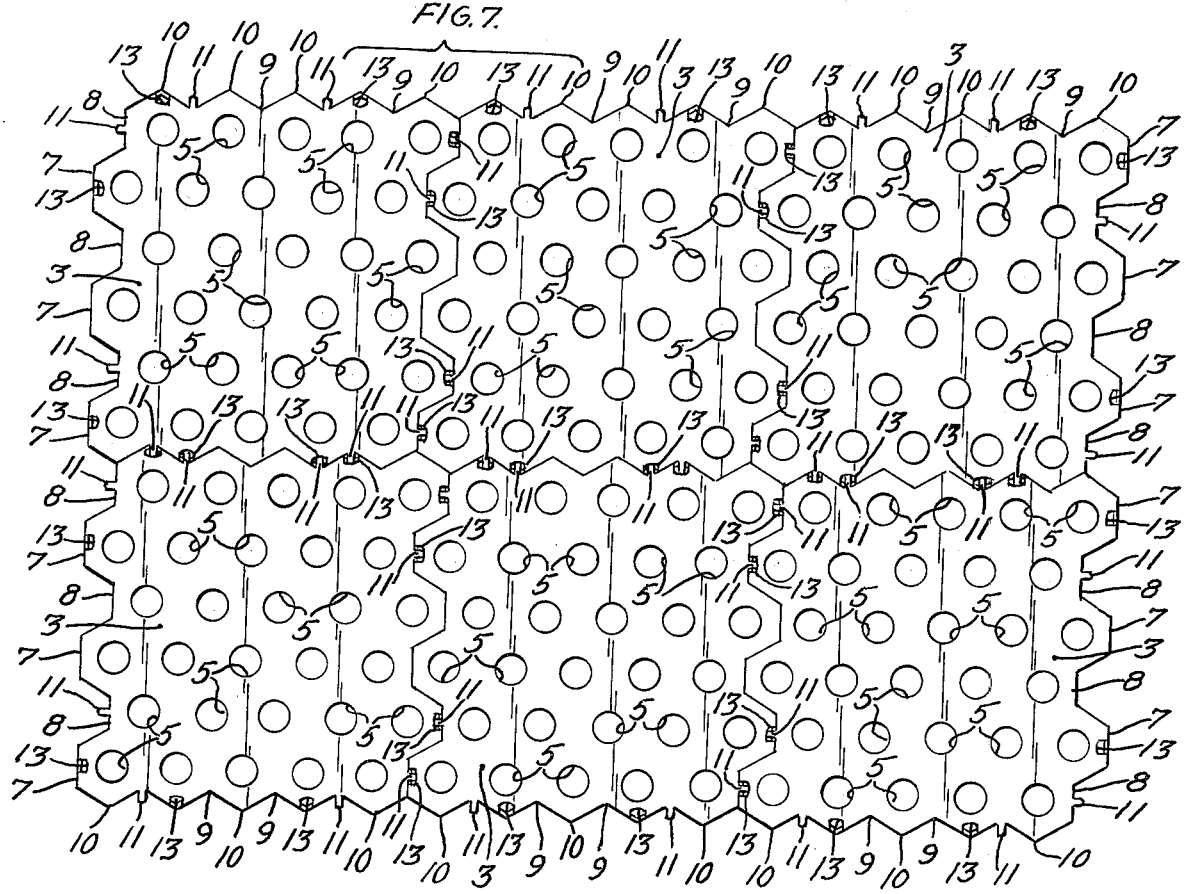
Figure 7:
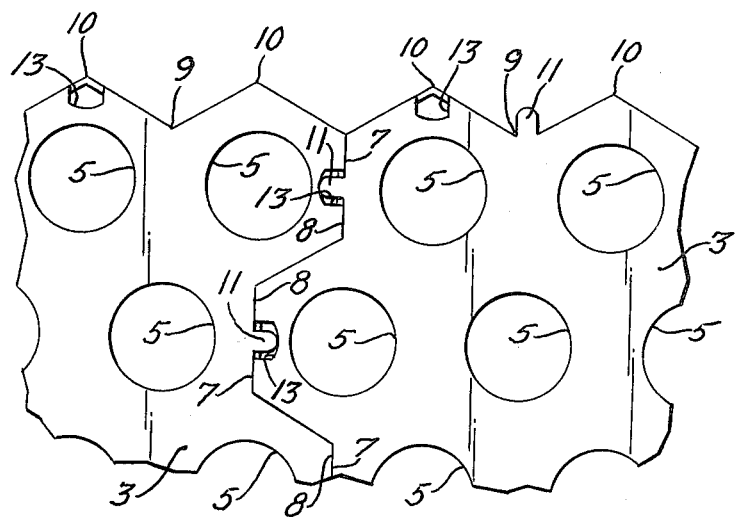
Figure 8:
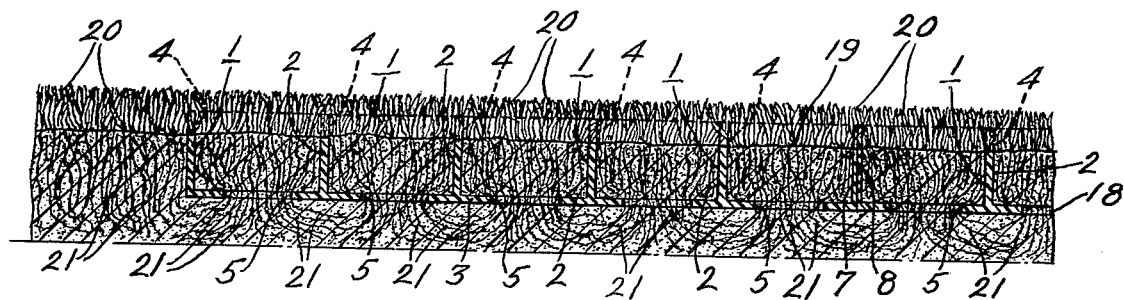
Figure 9:
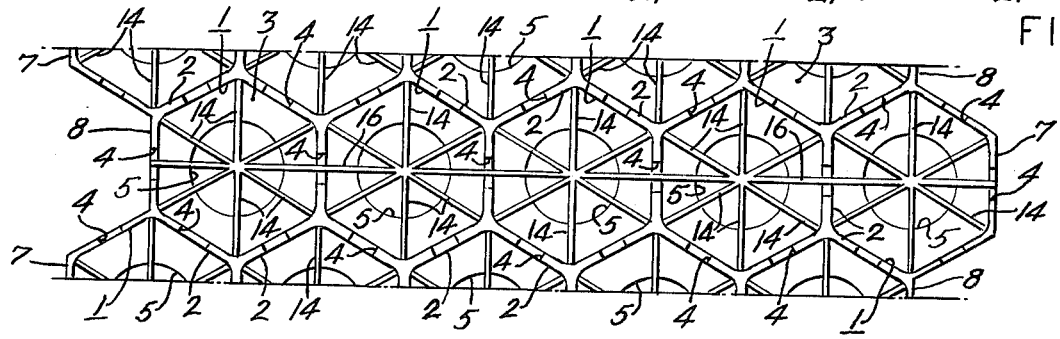

These and other objects of the invention and the various features and details of the construction and arrangement of an embodiment thereof are hereinafter set forth and described with reference to the accompanying drawings, in which:

FIG. 1 is a perspective view of a modular load and traction supporting unit embodying the present invention shown in detached relationship with a portion of an adjacent modular unit (shown in broken lines), FIG. 2 is a top plan view of a modular structure comprising a plurality of identical interlocked units constructed as shown in FIG. 1, FIG. 3 is a side elevational view of the structure shown in FIG. 2, FIG. 4 is an enlarged fragmentary top plane view of the portion of the structure embraced by line 4, FIG. 2, FIG. 5 is a sectional view on line 5—5, FIG. 4, FIG. 6 is a bottom plan view of the structure shown in FIG. 2, FIG. 7 is an enlarged fragmentary bottom plan view of the portion of the structure embraced by line 7, FIG. 6, FIG. 8 is a vertical sectional view through a turfgrass area having embedded thereon a modular structure of the present invention, FIG. 9 is a fragmentary top plan view of a module or unit having removable partition means therein for subdividing the cells of the units into smaller cells.

Figure 10:
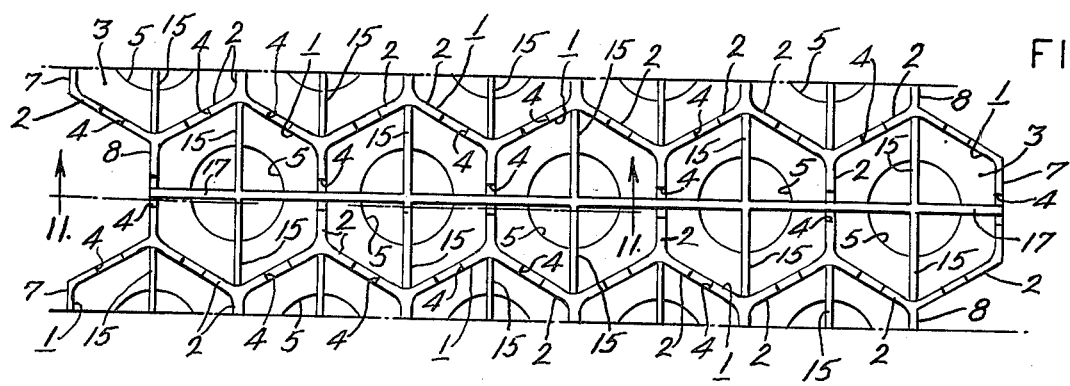
Figure 11:
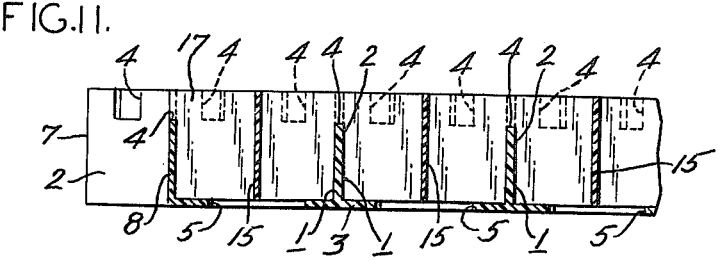
Figure 14:
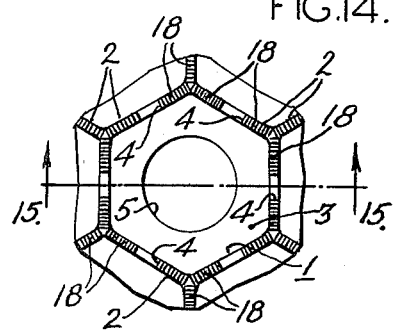
Figure 12:
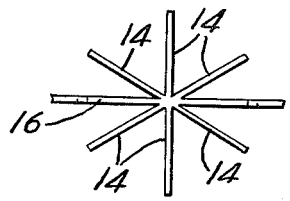
Figure 13:
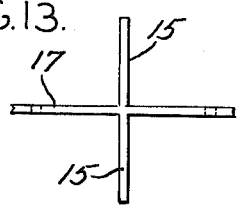
Figure 15:
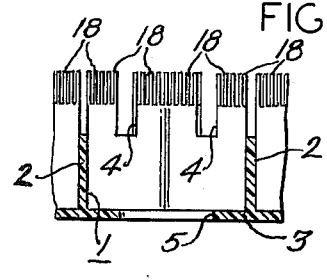

FIG. 10 is a view similar to FIG. 9 showing another removable partition means for subdividing the cells of the units, FIG. 11 is a fragmentary sectional view on line 11—11, FIG. 10, FIGS. 12 and 13, respectively, are detached fragmentary plan views of the partition means shown in FIGS. 9 and 10, FIG. 14 is a fragmentary plan view of a module showing a modified embodiment of the invention, and FIG. 15 is a vertical sectional view on line 15—15, FIG. 14.

Referring now to the drawings, each module or unit of the modular structure is identical, and one embodiment of such a unit made according to the present invention is shown more particularly in FIGS. 1, 4 and 5 thereof. As shown, each module or unit is of one-piece integral construction and comprises a plurality of laterally adjacent cells 1 having a geometrical cross section shape. Each cell 1 is open at the top and defined by a plurality of vertically extending side wall portions 2 and a common bottom wall 3. For purposes hereinafter described, the upper end or top of each side wall portion 2 between adjacent cells 1 of the unit is provided with a centrally located recess or slot 4 of predetermined depth, and the bottom wall 3 of the unit is provided with a plurality of holes or openings 5 therethrough, one such hole or opening 5 being located centrally in the bottom of each cell 1 of the unit as best shown in FIGS. 4 and 5 of the drawings.

As previously stated, each module or unit is of one-piece integral construction and preferably is fabricated of a suitable plastic material such as, for example, high density linear polyethylene, so that the units can be economically manufactured in quantity production by conventional injection molding procedures.

In the illustrated embodiment of the module or unit of the present invention, each of the plurality of cells 1 is of hexagonal cross-section shape and arranged in the unit so that aligned rows of cells 1 extend crosswise of the unit and adjacent cells in adjacent rows are disposed in staggered relation to one another with each side wall portion 2 being common to two adjacent cells. By constructing and arranging the plurality of cells in each module or unit as described, two opposite sides of the unit comprise laterally spaced alternate semi-hexagonal projecting and recessed wall portions 7 and 8, respectively, disposed for complementary interfitting engagement with corresponding wall portion projections 7 and recesses 8 of an adjacent unit as illustrated in FIG. 1. On the other two opposite sides of the module or unit, the construction provides laterally spaced alternate triangular projecting and recessed wall portions 9 and 10, respectively, disposed for complementary interfitting engagement with the corresponding triangular projections and recesses 9 and 10 of another adjacent unit.

Thus, a plurality of modules or units constructed and arranged as described can readily and easily be assembled in widthwise and lengthwise complementary interfitting relation as shown in FIGS. 2, 3 and 6 of the drawings to provide a modular structure of predetermined width and length as desired.

In accordance with the invention, each module or unit is provided with interlocking means to secure the plurality of units together in the described modular structure. To this end each unit is provided at the bottom edge of each side thereof with one or more selectively positioned integral projecting tabs 11 having upstanding lugs 12 thereon adapted to interlockingly engage within correpsondingly located openings 13 in adjacent units. Each unit also is provided at the bottom edge of each side thereof with one or more such openings 13 selectively positioned to receive the projecting tabs 12 of adjacent units, for example, as shown in FIGS. 4, 5, 6 and 7 of the drawings.

In some installations it may be desirable to subdivide the cells of all or selected units of a modular structure and this may be accomplished by providing partition inserts for the cells constructed, for example, as shown at 14 and 15, respectively, in FIGS. 9-13. Preferably, a plurality of the partitions is connected together for handling in one-piece by means of integral interconnecting bridge portions 16 and 17, respectively, that span the recesses 4 in the common wall portions 2 intermediate adjacent cells 1. Alternatively, the partitions can be fabricated individually or separately for each cell.

Although the embodiment of the invention has been shown and described with reference to a module or unit having cells of hexagonal cross section shape as preferred, it will be apparent that units having cells of other geometrical shapes such as, for example, square, diamond, or even circular, may be provided as desired.

In one commercial form of the invention each module or unit constructed as described is 1 foot square and 1½ inches in depth. To install a modular supporting structure comprising a plurality of said modules or units, the existing sod and soil is removed to a depth of 1½ inches for the width and length of the area to receive the modular support structure. A plurality of the modules is deposited in the excavated area and arranged crosswise and lengthwise thereof in interengaging interlocked relation as shown and described to provide a unitary modular structure overlying the entire surface 18 of the excavated area.

After the modular support structure has been positioned as described, the cells of the units comprised in the assembly are filled with a sandy loam soil mixed according to the climatic area in which the installation is made. It is important that the cells are filled only to a level 19 to the bottom edge of the recesses or slots 4 provided in the vertical wall portions 2 of the units so that the upper edge portions of the vertical side walls adjacent said recesses or slots 4 extend above the soil level 19 and into the turfgrass 20 as shown in FIG. 8 to support and bear the weight and wear of traffic passing over the area.

The soil in the cells is then seeded, top dressed and kept moist until the grass is established. As the grass grows, air, water and nutrients pass through the holes 5 in the bottom wall of the cells to the soil below and the grass roots 21 also extend through said holes and bind or tie the modular structure to the subsoil. The slots or recesses 4 provided in the side wall portions 2 of the cells allow the grass roots, stolons and rhizomes to extend freely laterally from cell to cell. Thus when the grass becomes established the modular structure is firmly bound and tied to the soil and the longer the installation is in place the stronger the turfgrass surface becomes. The bottom walls 3 of the units rest on the subsoil surface 18 and effectively support the structure from being depressed further into the soil so that all traffic and weight is supported and borne by the vertical wall portions 2 of the cells in the plurality of modules in the structure and the soil in the cells cannot be compacted. The turfgrass 20 can be mown in the usual manner by conventional equipment without damage to either the equipment or the modular support structure embedded in the soil.

The invention may also be used effectively in non-turfgrass areas such as a load and wear supporting structure in tree wells, the cells in the structure in such installations being filled with wood chips, sand, pebbles or other suitable material that will permit the passage therethrough of rain or other water to the underlying soil and tree roots.

The modular structure of the invention may also be effectively employed in playground turfgrass areas that are subjected to heavy wear and soil compaction. However, in such playground areas it is desirable to modify the module and modular structure previously described to provide at the upper edges of the cell wall portions 2 upwardly projection closely spaced thin grass-like elements 18 as shown in FIGS. 14 and 15 of the drawings. The elements 18 may be molded integral with the modules and are relatively flexible and resilient so as to minimize injury to persons falling thereon in playground areas where the modular structure is installed.

From the foregoing, it will be observed that the present invention provides a novel module and modular structure for supporting load weight and traffic in extensively used turfgrass and other areas and preventing soil compaction which inhibits the normal growth of turfgrass. The invention can also be used effectively to prevent or control soil erosion in numerous locations such as, for example, highway slopes, stream banks, slit trenches and other drainage areas.

While certain embodiments of the invention have been shown and described, it is not intended to limit the invention to such disclosures, and the invention is intended to cover any and all modules and modular structures coming within the scope of the following claims.

I claim:

1. A module for complementary interfitting interlocked engagement with adjacent like modules adapted to be embedded in the surface of a turfgrass area to form a modular supporting structure for traffic over said area, comprising an integral non-metallic one-piece unit of honeycomb-like cellular construction having a plane bottom wall adapted to rest upon and be supported by the subjacent turfgrass soil and a plurality of vertical wall portions of uniform height and thickness extending upwardly from said bottom wall and defining a plurality of rows of cells each containing a plurality of cells of uniform cross sectional area, each of said vertical wall portions being common to an adjacent pair of cells whereby each cell in each row is contiguous to the adjacent cell in said row and to adjacent cells in the next row thereof, all of said cells being open at the upper ends thereof in the top surface of the unit and partially closed at the lower ends thereof by the bottom wall of said unit, said bottom wall having a plurality of apertures therein each of less area than the cell cross-sectional area and arranged so that at least one aperture is located in the bottom wall of each cell for drainage and extension of turfgrass roots into the subjacent soil, each of said vertical wall portions having a recessed opening in the upper edge portion thereof providing cross-communication between each adjacent pair of cells for the lateral extension from cell to cell of turfgrass roots, stolens and rhizomes, the cells in each row being laterally offset with respect to the cells in the adjacent row and providing in the respectively opposite peripheral sides of the unit alternately disposed projecting portions and recesses arranged for complementary interfitting engagement with corresponding recesses and projecting portions of an adjacent unit, a plurality of selectively positioned interlock tabs projecting from each side of the unit, and means defining tab receiving openings selectively positioned in each side of said unit, said tabs and tab receiving openings being constructed and disposed for interlocking engagement with corresponding tab receiving openings and tabs of an adjacent unit.

2. A module as claimed in claim 1 wherein the cells are of hexagonal cross-section shape.

3. A module as claimed in claim 1 comprising removable partition inserts for the cells to subdivide said cells.

4. A module as claimed in claim 3 comprising bridge means connecting a plurality of said partition inserts so that said plurality of inserts can be inserted and removed as a unit.

5. A module as claimed in claim 1 comprising a plurality of closely spaced thin elements projecting from the edge of the cell wall portions in the plane thereof, said elements being relatively flexible and resilient.

6. A plurality of modules as claimed in claim 1 disposed in predetermined longitudinally and laterally extending abutting relation forming a modular support structure for turfgrass and other soil areas, the alternately disposed projecting portions and recesses in the abutting sides of adjacent modules being in complementary interfitting engagement, and the respective projecting tabs and tab receiving openings at said abutting sides of said adjacent modules being in interlocked engagement to secure the adjacent modules in said abutting relation.

7. A plurality of modules as claimed in claim 1 disposed in predetermined longitudinally and laterally extending abutting relation forming a modular support structure for turfgrass and other soil areas, the alternately disposed projecting portions and recesses in the abutting sides of adjacent modules being in complementary interfitting engagement and the respective projecting tabs and tab receiving openings at said abutting sides of said adjacent modules being in interlocked engagement to secure the adjacent modules in said abutting relation.

8. A modular support installation in a selected turfgrass area of predetermined length and width comprising a plurality of modules as claimed in claim 1 disposed in predetermined longitudinally and laterally extending abutting relation for the length and width of said turfgrass area and recessed into said area approximately to the height of the vertical cell defining wall portions of the modules with the bottom walls thereof supported by the subjacent soil, the alternately disposed projecting portions and recesses in the abutting sides of adjacent modules being in complementary interfitting engagement, the respective projecting tabs and tab receiving openings at said abutting sides of said adjacent modules being in interlocked engagement to secure the adjacent modules in said abutting relation, soil in each of the cells of the modules and turfgrass growing outwardly and upwardly therefrom, the opening in the bottom wall of each cell in said modules providing for drainage and extension of the turfgrass roots into the subjacent soil beneath the modules whereby the modular support is firmly bound and tied to the subjacent soil, and the upper edges of the wall portions of the cells of the modules extending above the soil level and into the turfgrass to support and bear the weight and wear of traffic passing over the turfgrass area.

* * * * *